Dec. 18, 1951 F. W. HECKERT 2,579,258
GRILL-SPATULA ASSEMBLY
Filed April 9, 1948
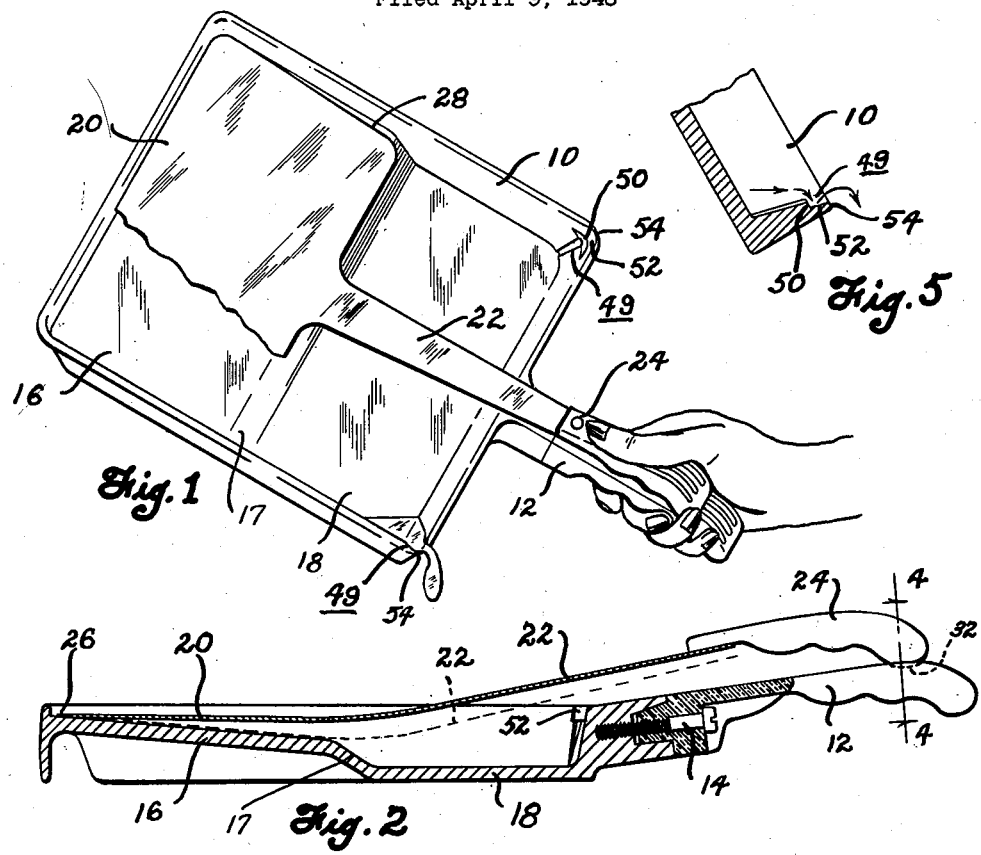
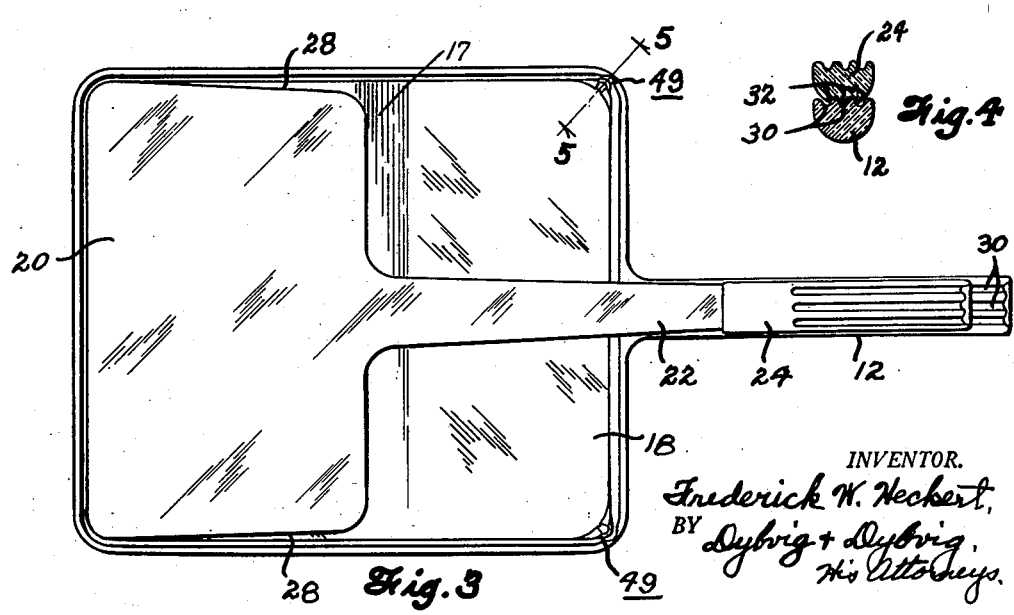
INVENTOR.
Frederick W. Heckert,
BY Dybvig + Dybvig,
His Attorneys.

Patented Dec. 18, 1951

2,579,258

UNITED STATES PATENT OFFICE 2,579,258

GRILL-SPATULA ASSEMBLY

Frederick W. Heckert, Dayton, Ohio

Application April 9, 1948, Serial No. 19,899

1 Claim. (Cl. 99—349)

This invention relates to a kitchen utensil and more particularly to a combination of a grill and lid-spatula arrangement in which the lid-spatula may be used either as a lid or a spatula.

It is an object of this invention to provide a grill and lid-spatula combination for use in simultaneously preparing two different kinds of foods, such as bacon and eggs.

The desirability of preparing two kinds of foods simultaneously has long been recognized and various arrangements have been devised for this purpose, but they have failed to fully reckon with the problems involved resulting from the unlike characteristics of the unlike foods. Thus in a grill intended for use in preparing bacon and eggs simultaneously, it is desirable to provide an arrangement in which at least some of the bacon grease may be used in frying the eggs but in which it is not necessary to contend with all of the bacon grease.

It is an object of my invention to provide a grill in which it is possible to drain off any desired portion of the bacon grease without dislodging or disarranging the bacon on the grill and without causing any of the grease to run down the outer edge of the grill.

More particularly, it is an object of this invention to provide an ingenious lid arrangement for use in holding the bacon in place while the excess grease is poured off.

It is also an object of this invention to provide an improved pouring spout which makes it possible to pour off the excess grease without danger of any of the grease running down the outside of the grill.

Another object of this invention is to provide a lid which may be used for covering the one portion of the grill without covering the remainder of the grill.

Still another object of this invention is to provide a lid which serves as a lid while the food is being prepared and serves as a spatula for removing the food from the grill after it is prepared.

It is another object of this invention to provide an improved arrangement for properly positioning the lid on the grill.

Still another object of this invention is to provide an improved spatula construction.

Other objects and advantages reside in the construction of parts, the combination thereof and the mode of operation, as will become more apparent from the following description.

In the drawing, Figure 1 is a perspective view of a preferred embodiment of my invention;

Figure 2 is a vertical sectional view;

Figure 3 is a plan view;

Figure 4 is a sectional view taken on line 4—4 of Figure 2; and

Figure 5 is a fragmentary sectional view taken substantially on line 5—5 of Figure 3.

Referring now to the drawing wherein I have shown a preferred embodiment of my invention, reference numeral 10 designates generally a grill having a handle 12 secured thereto in any suitable manner, such as by the screw 14 as shown in Figure 2. The handle is preferably made of molded heat resistant plastic material, but other materials, such as wood, could be used. The grill comprises a first inclined surface 16 which is intended to be used for preparing one type of food, such as strips of bacon or the like, and a second substantially horizontally disposed surface 18 which is designed for use in preparing a second type of food, such as eggs. An offset 17 is provided between the upper inclined surface 16 and the lower horizontally disposed surface 18. The arrangement of the surfaces 16 and 18 is such that any grease or the like will drain from the surface 16 into the lower part of the grill comprising the surface 18. The grill is preferably made of cast aluminum or some similar material, so as to obtain even heat distribution throughout the cooking surface.

A combination lid and spatula has been provided which comprises a rectangular portion 20, a long narrow flexible handle or stem portion 22, and a rigid handle 24 which is riveted or otherwise suitably secured to the outer end of the flexible stem 22. The forward end of the rectangular portion 20 is beveled, as indicated at 26, so as to facilitate the use of the rectangular portion 20 as a spatula for loosening food from the bottom of the grill. The sides of the lid-spatula are tapered, as indicated at 28, so as to make it possible to shift the handle from side to side as the beveled edge 26 is progressively moved along the bottom surface of the grill for loosening any food that may be adhering to the bottom of the grill. The front end of the spatula comprising the beveled edge 26 is preferably made wide enough to reach all the way across the bottom of the grill.

The stem 22 is tapered in such a manner that the widest portion of the stem is adjacent the rectangular portion 20 and the narrowest portion is attached to the handle 24. There are several advantages in this construction. One of the main advantages is in the improved flexing characteristics of the stem 22. Another advantage resides in providing the preferred construction from the standpoint of strength whereby repeated flexing of the stem does not cause breakage of the stem. The shape of the lid-spatula in general is such that it is possible to efficiently stamp the lid-spatula from sheet material without needlessly wasting material.

The lid-spatula is preferably formed of stainless steel, although other types of material may be used. Stainless steel has been found to be a very practical material for use in fabricating the lid-spatula in that it provides the necessary rigidity and flexibility as well as being stainless.

In order to avoid any sidewise movement of the handle when the lid-spatula is used as a lid for covering food being prepared on the grill surface 16, the upper side of the grill handle 12 is provided with a plurality of grooves 30 and the lower rear end of the lid-spatula handle 24 is provided with a plurality of registering corrugations 32 which fit down into the grooves 30 so as to inhibit sidewise movement of the handle 24 relative to the handle 12.

In referring to Figure 2 of the drawing, it will be noted that the normal shape of the lid-spatula is such that it would occupy the position in which it is shown in Figure 3 of the drawing. However, by applying pressure to the upper side of the handle 24, it is possible to flex the stem 22 so as to press the rear end of the rectangular portion 20 downwardly toward the surface 16. This arrangement is particularly advantageous when preparing bacon and eggs, since it makes it possible to press the bacon against the grill so as to prevent curling of the bacon and so as to provide for more uniform treatment of the bacon. Furthermore, the rectangular spatula portion 20 can be shifted so as to cover the eggs or other food in the lower compartment.

In order to make it possible to drain off excess grease when preparing bacon and eggs, without excessively tilting the grill and without dislodging the eggs being fried and without the danger of the grease running down the outer edge of the grill, I have provided a special pouring spout construction 49, as best illustrated in Figures 3 and 5. I have found that by providing a drop-off surface 50 intermediate the ends of the pouring surface of the spout 49, the grease leaving the spout tends to be deflected upwardly from the final incline surface designated by the reference numeral 52, as indicated by the arrows. I have also found that by making the final lip 54 very thin, it is possible to reduce the tendency of the grease to flow by capillary action around the corner of the lip 54. This construction combined with the drop-off surface 50 makes it possible to pour off the excess grease without any of the grease running down over the edge of the pan. Duplicate pouring spouts have been provided at the two rear corners of the grill, as shown in Figures 1 and 3.

By virtue of the above described arrangement, it is possible to prepare combinations of foods which are to be served together. In the case of bacon and eggs, for example, as the bacon is heated the grease continuously runs down the incline into the lower compartment of the dual purpose grill and the natural delicious flavor of the bacon is retained and the hard to digest greases may be drained off in a most scientific manner. Whereas the grill is especially suitable for use in preparing bacon and eggs, it may also be used in frying hamburgers, pancakes, potato cakes, pork chops and potatoes, and similar foods. The pouring spout construction helps to keep the grill clean, whereby restaurants and the like can serve the food to the patrons right in the grill.

Although the preferred embodiment of the device has been described, it will be understood that within the purview of this invention various changes may be made in the form, details, proportion and arangement of parts, the combination thereof and mode of operation, which generally stated consist in a device capable of carrying out the objects set forth, as disclosed and defined in the appended claim.

Having thus described my invention, I claim:

In a cooking utensil, a grill including an offset transversely dividing the bottom of the grill from side to side so as to form two cooking portions arranged at different levels, one of which is a depressed cooking portion on the one side of said offset, the other of which is an elevated cooking portion inclined away from the depressed portion on the opposite side of the offset, a handle secured to said grill, and a lid-spatula adapted to fit down into one of said portions and having a handle secured thereto by means of a flexible stem, said first and second named handles having interengaging guide surfaces provided thereon for preventing relative movement between said handles in a sidewise direction but allowing relative movement longitudinally.

FREDERICK W. HECKERT.

REFERENCES CITED

The following references are of record in the file of this patent:

UNITED STATES PATENTS

| Number | Name | Date |
|---|---|---|
| Re. 21,214 | Fishel | Sept. 26, 1939 |
| Re. 21,688 | VanNess | Jan. 7, 1941 |
| 856,446 | Collins | June 11, 1907 |
| 1,212,833 | Stackhouse | Jan. 16, 1917 |
| 1,241,010 | Paquette | Sept. 25, 1917 |
| 1,416,309 | Tunniecliff | May 16, 1922 |
| 1,624,745 | Kuhnast | Apr. 12, 1927 |
| 1,803,006 | Davis | Apr. 28, 1931 |
| 1,824,783 | Molleson | Sept. 29, 1931 |
| 1,936,551 | Garrison | Nov. 21, 1933 |
| 2,080,171 | Fairbanks et al. | May 11, 1937 |
| 2,081,165 | Bretney | May 25, 1937 |
| 2,134,807 | Winger | Nov. 1, 1938 |
| 2,200,335 | Ingersoll | May 14, 1940 |
| 2,262,302 | Sinclair | Nov. 11, 1941 |
| 2,310,157 | Volks | Feb. 2, 1943 |
| 2,442,047 | Kemper | May 25, 1948 |